US006216719B1

(12) United States Patent
Meyer

(10) Patent No.: US 6,216,719 B1
(45) Date of Patent: Apr. 17, 2001

(54) SAFETY SYSTEM FOR TRANSFER OF PRESSURIZED FLUIDS

(75) Inventor: Daniel R. Meyer, Ankeny, IA (US)

(73) Assignee: Mapco, Inc., Tulsa, OK (US)

( * ) Notice: Subject to any disclaimer, the term of this patent is extended or adjusted under 35 U.S.C. 154(b) by 0 days.

(21) Appl. No.: 09/257,615

(22) Filed: Feb. 25, 1999

Related U.S. Application Data

(63) Continuation of application No. 08/868,375, filed on Jun. 3, 1997, now Pat. No. 5,921,266.

(51) Int. Cl.[7] .................................................... F16K 17/40

(52) U.S. Cl. .................................... 137/68.14; 137/487.5; 137/596.17; 251/129.04; 251/294

(58) Field of Search ............................. 137/68.14, 487.5, 137/596.17, 488; 251/129.04, 294

(56) References Cited

U.S. PATENT DOCUMENTS 2,773,251 * 12/1956 Snyder ............................. 137/487.5
3,628,563 * 12/1971 Tomita .......................... 137/487.5 X
3,675,072 * 7/1972 Hahn et al. ................... 137/487.5 X
3,788,341 * 1/1974 Athy, Jr. et al. ................. 137/488 X
4,066,095 * 1/1978 Massa ................................. 137/486
4,145,025 * 3/1979 Bergeron .......................... 137/456 X

* cited by examiner

*Primary Examiner*—John Rivell
(74) *Attorney, Agent, or Firm*—Head, Johnson & Kachigian

(57) ABSTRACT

A safety system for transfer of pressurized fluid between a cargo tank vehicle and a storage container. A pump or compressor on the cargo vehicle is in fluid communication with the cargo tank, the pump being powered by the vehicle. A pump valve on the vehicle between the tank and the vehicle pump will interrupt fluid passing into the pump. A delivery hose having a first end in fluid communication with the pump and a second end in fluid communication with the storage container transfers the pressurized fluid between the pump and storage container. A first pressure sensor senses pressurized fluid in the delivery hose near the hose second end. A first switch activated by the first pressure sensor closes the pump valve and interrupts the fluid flow. A second pressure sensor senses pressure near the hose first end. A second switch activated by pressure from the second pressure sensor closes the pump valve and interrupts fluid flow.

5 Claims, 6 Drawing Sheets

SAFETY SYSTEM FOR TRANSFER OF PRESSURIZED FLUIDS

This is a continuation of Ser. No. 08/868,375 filed on Jun. 3, 1997 now U.S. Pat. No. 5,921,266.

BACKGROUND OF THE INVENTION

1. Field of the Invention

The present invention is directed to a safety system for transfer of pressurized fluids. In particular, the present invention is directed to an automatic shutoff system for transfer of pressurized fluids from a cargo tank vehicle to a storage container through a delivery hose.

2. Prior Art

Pressurized fluids, such as compressed liquid gases, are utilized in a variety of applications. Liquified compressed gases include carbon dioxide ($CO_2$), butane ($C_4H_{10}$), anhydrous ammonia ($NH_3$), and propane($C_3H_8$). Propane and butane (known commercially as LP gas or LPG) have an extremely wide range of domestic, industrial, and agricultural uses. Among the uses are appliance fuel, industrial and utility furnaces, industrial heating processes such as heat treating and metal cutting, and vehicle fuel. Liquified compressed gases generally are those which become liquids in containers at ordinary temperatures at pressures from 25 to 2500 psig. As an example, the pressure of liquid propane at 70° F. (21.1° C.) is approximately 110–125 psig (756.4 KiloPascal KPa).

Liquified compressed gases are categorized as hazardous materials. Those who transport compressed gases must comply with a variety of government safety regulations in the United States, Canada and other countries throughout the world. Liquified compressed gases are shipped under rules that limit the maximum amount that can be put into a container to allow space for liquid expansion. For example, in the United States, a cargo tank (defined as a tank permanently attached to or forming a part of a motor vehicle) selected for transporting a specific compressed gas must be a container authorized for that S product and the container must be qualified with Department of Transportation (DOT) regulations. These regulations are contained in Title 49 of the Code of Federal Regulations, Parts 100 to 199.

Additionally, with flammable gases, it is necessary to guard against the possibility of fire or explosion. For example, when liquid propane is released into the atmosphere, it quickly vaporizes into its normal non-pressurized gaseous form. The propane combines rapidly with air to form fuel-air mixtures which are ignitable over a range of 2.2 to 9.5% by volume.

In the liquified compressed gas industry, transportation between the producer and the consumer is important. In many instances, the producer and consumer are separated by considerable distances. Large quantities of compressed gas must be transported over long distances by safe and economical methods. Liquified compressed gases are often transported in special tank cars, motor trucks, boat and train facilities.

For example, the propane industry in the U.S. transports between 7 and 10 billion gallons annually in highway transport vehicles to storage sites. The same volume is transported again from storage sites in local delivery bobtail trucks to storage containers.

Cargo tank motor vehicles have been developed to transfer liquified compressed gases. Two basic types are well known. Cargo tank motor vehicles known as "highway transports" are large cargo tanks mounted on semi trailers pulled by a highway truck tractor. A typical transport may carry 9000–16000 gallons of liquid. Cargo tanks must comply with DOT Specification MC-330 or MC-331. Smaller cargo tank motor vehicles, known as "bobtails", are cargo tanks mounted directly on a vehicle chassis. A bobtail may carry up to 5000 gallons of liquid.

In each type, a pump on the vehicle is powered by the vehicle engine, meaning that the engine must remain on during unloading.

In the case of highway transports, liquified compressed gas is transferred from the highway transport to a storage container by means of a hose. A pump is mounted on the highway transport to move the liquified gas from the cargo tank, through the hose and into the storage container. A pump valve is located on the highway transport between the cargo tank and the pump. The pump valve may be operated manually by the operator or may have an automatic feature that will close the valve in the event of a drop in the pressure.

In the case of bobtails, liquified compressed gas is transferred from the bobtail storage tank to a storage container by means of a hose.

Notwithstanding the foregoing, the existing vehicle belly valve may not be automatically activated in the event of a rupture, a severing or uncoupling of the hose. Most recently, the U.S. Department of Transportation has announced proposed rules and interim rules relating to emergency discharge control systems on cargo tanks (see, for example, 49 CFR §178).

For these reasons, there still remains a need for an automatic safety shutoff system in the event of a rupture, severing or uncoupling of a delivery hose between a cargo tank vehicle and a storage container.

It is, therefore, a principal object and purpose of the present invention to provide an automatic safety shut off system in the event of a rupture, severing, or uncoupling of a delivery hose between a cargo tank vehicle and a storage container.

SUMMARY OF THE INVENTION

The present invention is directed to the transfer of pressurized fluid between a cargo tank vehicle and a storage container. A cargo tank vehicle includes a cargo tank to store pressurized fluids, such as liquid propane. An engine not only powers the vehicle but includes a power take off that will power a pump or compressor. A belly valve mounted on the vehicle is in fluid communication with the cargo tank and in fluid communication with the pump. The belly valve includes a normally closed moveable butterfly plate. When the valve is closed, no pressurized fluid can pass between the cargo tank and the pump.

Outflow from the pump is connected to a delivery hose. The delivery hose has a first end in fluid communication with the pump and its coupling. The delivery hose also has a second end in fluid communication with the storage container. Near the hose second end, a hose coupling includes an opening therethrough to which will be attached a small pressure hose in fluid communication with the pressurized fluid. The pressure hose leads back to a first pressure sensor which can detect a drop in pressure and de-energize a set of electrical contacts. The first pressure sensor is connected to a first switch. The first switch will activate or deactivate a supply solenoid and supply valve and a bleed solenoid and bleed valve. The supply and bleed valves are in line with the air pressure system of the vehicle which operates the belly valve.

Near the hose first end, in fluid communication with the pump, the coupling includes an opening to which will be attached a small pressure hose in fluid communication with the pressurized fluid in the delivery hose. The pressure hose leads back to a second pressure sensor which can detect a drop in pressure and de-energize a set of electrical contacts. The second sensor is, in turn, connected to a second switch. The second switch will activate or deactive the supply and bleed solenoids and valves.

A further, additional mechanical safety mechanism may be employed. Accompanying and attached to the delivery hose is a thin, steel cable. The cable may be attached at periodic intervals to the delivery hose or, alternatively, may be formed integrally with the delivery hose. The cable has a first end . terminating in a pin receivable in a switch receptacle on the control box. The switch receptacle is likewise wired to the supply and bleed valves. When the pin is retracted or disengaged, the belly valve will be closed. The cable has a second end which is connected to an eyelet attached to the storage container. A rupture, severing, or uncoupling of the delivery hose will cause deflection of the hose. Deflection of the delivery hose will cause the pin to retract or become disengaged from the switch receptacle. Accordingly, the supply and bleed valves will cause the belly valve to close, preventing additional pressurized fluid from escaping from the storage tank of the vehicle.

DETAILED DESCRIPTION OF THE PREFERRED EMBODIMENTS

The present invention may be employed in various applications of transportation and delivery of pressurized fluids. In the present embodiments, delivery of compressed gas will be described in two particular applications. Both apply to distribution of compressed propane although the teachings of the invention may be used in many other applications. In the first application, liquid propane is transported in a highway transport vehicle and transferred from the highway transport vehicle to a storage container at a storage facility that is a distribution point. In the second application, the liquid propane is transported in a bobtail cargo vehicle and transferred from a bobtail cargo vehicle to a storage container or drum, such as found at a residential location.

It will be understood that although the invention is described in connection with transferring fluid from a cargo tank vehicle to a storage container, it will function to transfer fluid in the reverse direction.

Figure 1:
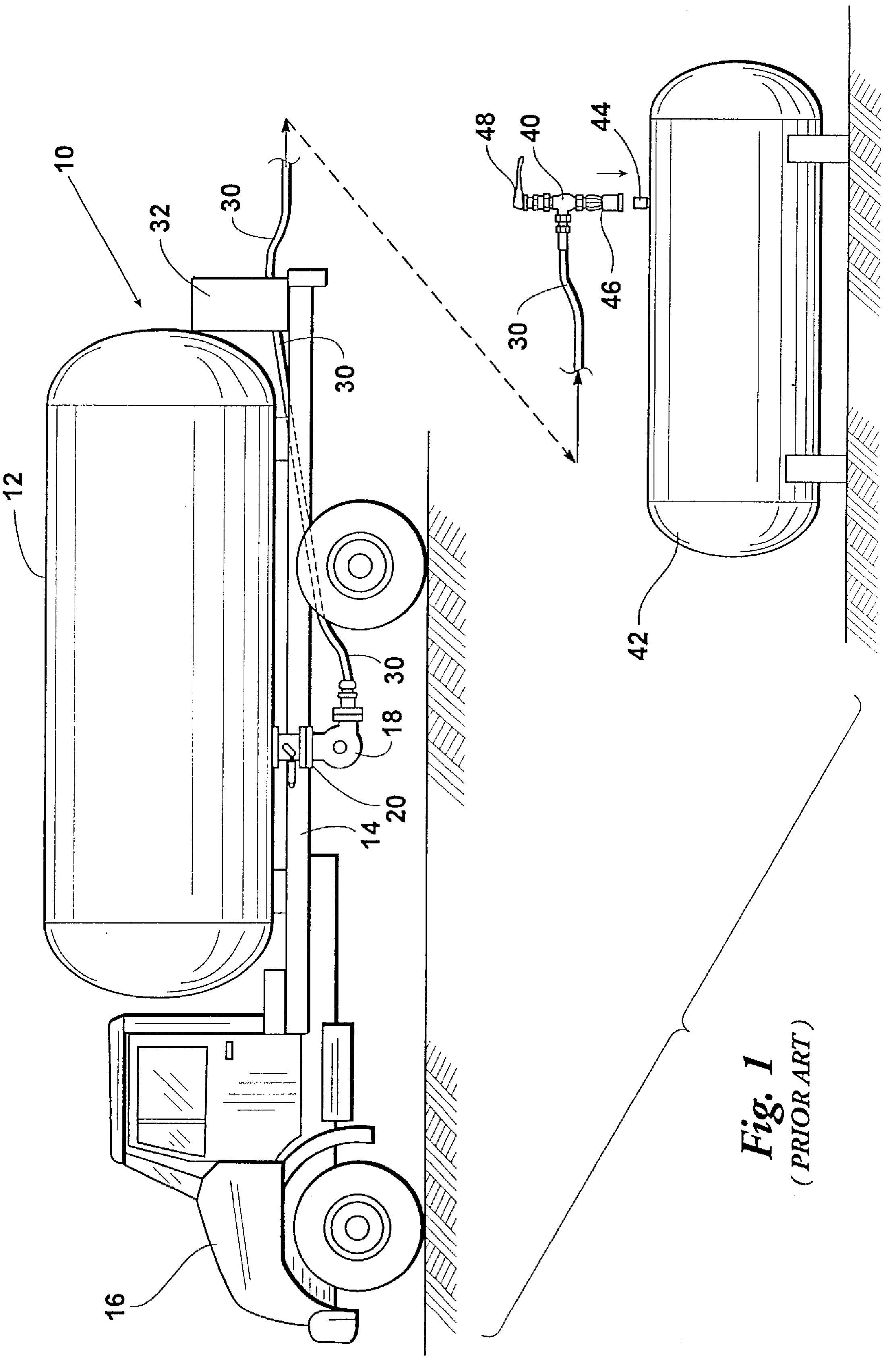
Fig. 1 (PRIOR ART)
FIG. 1 is a side view of a typical bobtail cargo tank vehicle connected to a storage tank for delivery of compressed fluid prior to introduction of the present invention.

Referring to the drawings in detail, FIG. 1 illustrates a prior art system of transferring compressed gas from a bobtail cargo vehicle to a storage container. A bobtail cargo tank vehicle 10 is shown with a cargo tank 12 mounted on the chassis 14 of the vehicle. The cargo tank is built to store pressurized gases such as liquid propane. The bobtail vehicle 10 includes an engine 16 that not only powers the vehicle but also a power take off (not visible in FIG. 1) that will power a pump 18 or a compressor. The engine 16 also powers an air pressure system to be described in detail herein.

A hose 30 has a first end in fluid communication with the outflow from the pump 18. Controls for the pump may be located at a control station 32. During transportation, the hose 30 is wound up and stored in the control station 32. A normally closed belly valve 20 mounted on the vehicle is juxtaposed between the pump and cargo tank.

The delivery hose 30 terminates at a second end in a hose end coupling 40 that will be connected to a storage tank 42 through a tank coupling 44. The hose end coupling 40 includes a spring loaded valve to keep the hose in a normally closed position. The tank coupling 44 has threads to attach to threads on a handle assembly 46 of the hose end coupling 40. A lever 48 will open the normally closed coupling to allow transfer of fluid. After transfer, the pressurized fluid is stored in the storage tank 42 or drum for usage. The storage tank 42 includes various regulators and control valves (not shown), all as well known.

The configuration of a highway transport vehicle would be similar to the bobtail cargo tank vehicle 10 shown in FIG. 1, all of which have been in existence prior to the introduction of the present invention.

Figure 2:
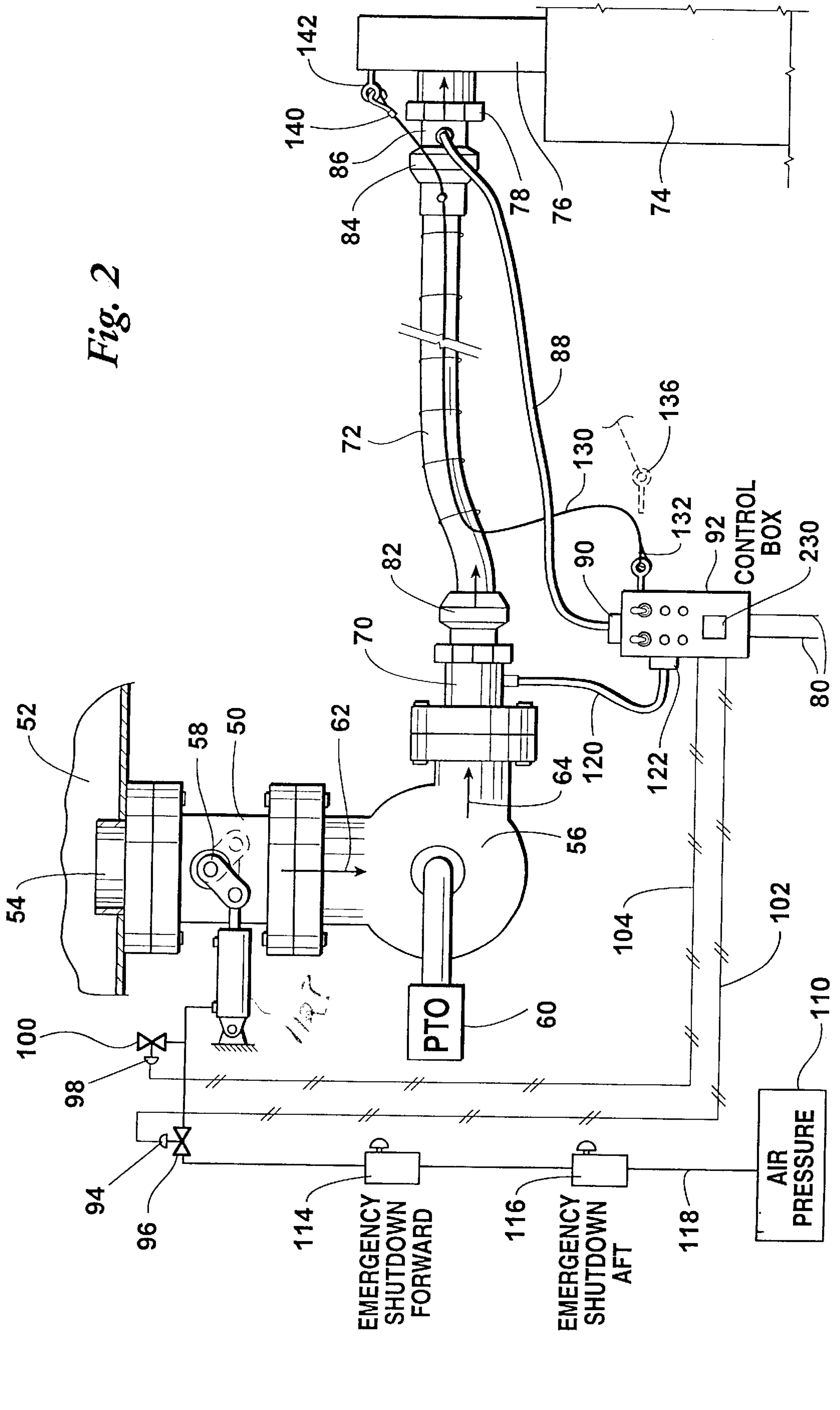
FIG. 2 is a diagrammatic representation of the present system for transfer of pressurized fluid from a cargo tank vehicle to a storage container in use with a highway transport vehicle.
Figure 3:
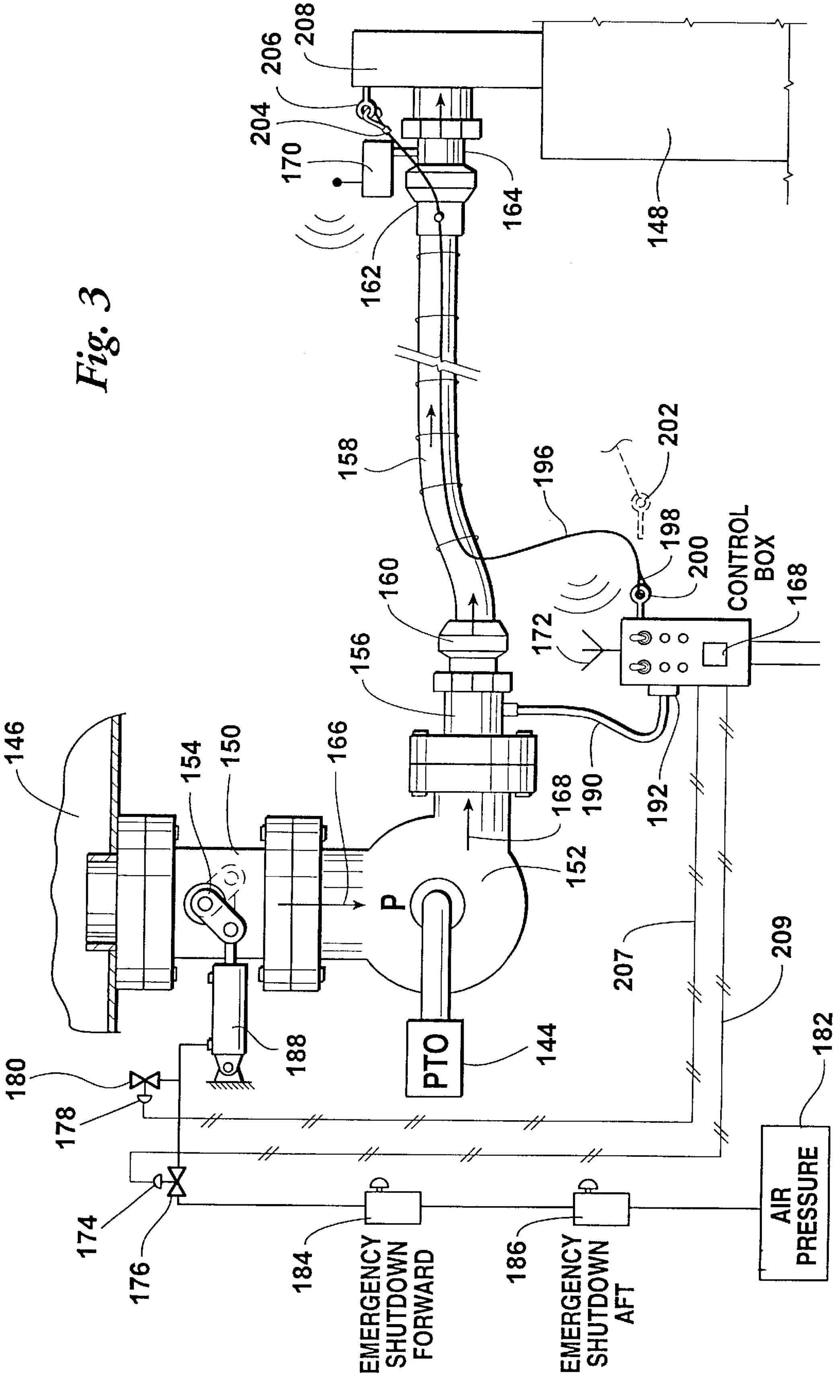
FIG. 3 is an alternate embodiment of a system for transfer of pressurized fluid from a cargo tank vehicle to a storage container in use with a highway transport vehicle.
Figure 4:
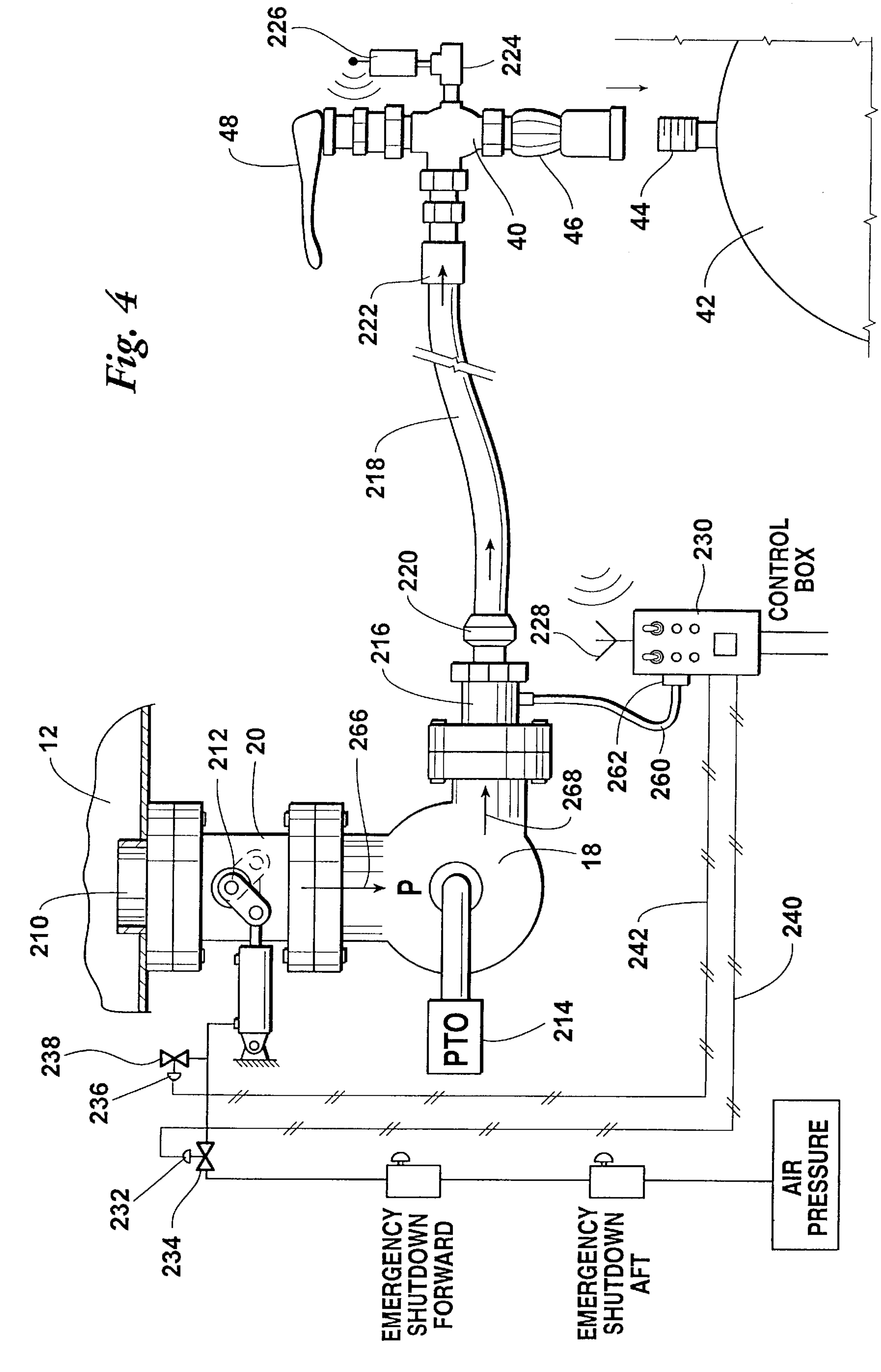
FIG. 4 is a further, alternate embodiment of a system for transfer of pressurized fluid from a cargo tank vehicle to a storage container in use with a bobtail cargo tank vehicle.

FIGS. 2, 3, and 4 show three alternate embodiments of the present invention for transferring pressurized fluid. FIG. 2 illustrates one embodiment for use with a highway transport vehicle. A belly valve 50 is mounted on the semi-trailer body and in fluid communication with a tank 52 of a highway transport vehicle through opening 54.

The belly valve 50 is, in turn, in fluid communication with a pump 56 or compressor. Various types of liquid pumps or compressors may be utilized. The belly valve 50 may take many forms although a typical butterfly valve is shown in the embodiments of FIGS. 2, 3, and 4.

The normally closed butterfly valve has a movable plate 58. When the belly valve 50 is closed, no pressurized fluid can pass from the cargo tank 52 to the pump 56. Conversely, when the belly valve 50 is open, pressurized fluid can flow from the cargo tank 52 to the pump 56.

As seen by the box marked "PTO", the pump 56 is driven by the power take off 60 from the vehicle engine (not visible). The vehicle engine must, thus, be on for the pump 56 to operate.

The direction of fluid flow in to the pump 56 from the belly valve 50 is indicated by arrow 62. The direction of fluid flow out of the pump 56 is indicated by arrow 64.

The outflow from the pump 56 is connected to a coupling 70 which, in turn, is connected to a delivery hose 72. When the transport vehicle arrives at the site of a storage container 74, the delivery hose 72 will be connected between the pump 56 and storage container 74. The delivery hose 72 has a first end 82 in fluid communication with the pump 56 and its coupling 70. The delivery hose 72 also has a second end 84 in fluid communication with the storage container 74. The storage tank 74 includes a riser 76 and a threaded coupling 78.

Near the hose second end 84, a hose coupling 86 includes an opening therethrough to which will be attached a small, quarter inch pressure hose 88 that is in fluid communication with the pressurized fluid in. the delivery hose 72. When pressurized fluid fills the delivery hose, it will also enter the pressure hose 88. The pressure hose 88 leads back to a first pressure sensor 90 which can detect a drop in pressure and de-energize a set of electrical contacts. The first pressure sensor is configured to convert fluid pressure into an electrical signal. In the present embodiment, the pressure sensor is an electromechanical pressure transducer although other types of pressure sensors are possible within the teachings of the invention.

The first pressure sensor 90 is, in turn, connected to a control box 92. The control box 92 will be wired to the electrical system of the vehicle to supply voltage through wires 80 and mounted in a location readily accessible to the operator. A first switch is activated by the first pressure sensor 90.

The first switch will activate or deactivate a supply solenoid 94 and supply valve 96 and a bleed solenoid 98 and bleed valve 100. The control box 92 and the supply solenoid 94 and bleed solenoid 98 are connected by electric lines 102 and 104, respectively.

An air pressure system illustrated by box 110 is powered by the engine of the transport vehicle. Typically, the existing air pressure system of the vehicle used for the vehicle air brakes will be used. The engine fills a compressed air tank (not shown) which is in communication with a cylinder 112 through air line 118.

The air pressure system 110 includes a switch (not shown) that may be activated by the operator to open the belly valve 50. The vehicle, as presently required by regulation, also includes emergency manually operated switches in at least two vehicle locations—forward and aft—to shut down the air pressure system in an emergency. These are illustrated at boxes 114 and 116. In the event the operator detects a problem, either emergency switch 114 or 116 may be thrown to close the belly valve 50. These are separate from the automatic shut-off system of the present invention and can not override it.

When the supply solenoid 94 opens the supply valve 96 and the bleed solenoid 98 closes the bleed valve 100, the cylinder 112 will open the plate 58 of the belly valve 50. Accordingly, compressed fluid will flow from the cargo tank 52 through the belly valve 50, into the pump 56 and thereafter into delivery hose 72. While the pump will force fluid into the delivery hose, it will be understood that the compressed nature of the fluid will cause the fluid to quickly pressurize the delivery hose.

In the event of a drop in pressure, the first switch will close the supply valve 96 and open the bleed valve 100, so that cylinder 112 will allow the belly valve 50 to close.

Near the hose first end 82, in fluid communication with the pump 56, the coupling 70 includes an opening to which will be attached a small, quarter inch pressure hose 120 in fluid communication with the pressurized fluid in the delivery hose 72. The pressure hose 120 leads back to a second pressure sensor 122 which can detect a drop in pressure and de-energize a set of electrical contacts. The second pressure sensor 122 is, in turn, connected to the control box 92. Control box 92 includes a second switch which is activated by voltage from the second pressure sensor 122.

The second switch will activate or deactivate the supply solenoid 94 and supply valve 96 and bleed solenoid 98 and bleed valve 100. It will be appreciated that either the first switch or second switch is capable of closing the belly valve 50.

The embodiment in FIG. 2 includes an additional mechanical safety system. Accompanying and attached to the delivery hose 72 is a thin, steel cable 130. The cable 130 may be attached to the delivery hose every 6 to 8 inches or, alternatively, may be formed integrally with the hose. The cable 130 has a first end 132 terminating in a pin 134 which is receivable in a switch receptacle on the control box 92. The switch receptacle is likewise wired to the supply valve 96 and bleed valve 100. When the pin 134 is retracted, as seen in dashed lines 136, the belly valve will be closed. The cable 130 has a second end 140. The cable second end 140 will be connected to an eyelet 142. In the event of a rupture of the delivery hose, of severing of the hose 72, or of disconnection of the delivery hose from one of the couplings, the pressurized fluid will quickly escape. It has been found that pressurized fluid escaping from the delivery hose 72 will cause deflection of the delivery hose.

Deflection of the delivery hose 72 will cause the pin 134 to retract or disengage from the switch receptacle. Accordingly, the supply and bleed valves 94 and 98 will cause the cylinder to move the plate 58. The belly valve will close, preventing additional pressurized fluid from escaping from the storage tank on the vehicle.

FIG. 3 is an alternate embodiment of the present invention for transfer of compressed fluid from a transport cargo tank 146 to a storage container 148. A belly valve 150 is in fluid communication with a pump 152. The butterfly valve is normally closed with a movable plate 154. The pump 152 or compressor is driven by power take off 144 of the vehicle engine.

The direction of fluid flow from the belly valve 150 in to the pump 152 is illustrated by arrow 166. The direction of fluid flow out of the pump is indicated by arrow 168.

The outflow from the pump 152 is connected to a coupling 156 which is, in turn, connected to a delivery hose 158. The delivery hose 158 has a first end 160 in fluid communication with the pump and its coupling 156. The delivery hose 158 also has a second end 162 in fluid communication with the storage container 148. Near the hose second end 162, a coupling 164 includes an opening therethrough in which is inserted a first pressure sensor (not visible in FIG. 3) which can detect a drop in pressure and de-energize a set of electrical contacts.

The first pressure sensor is, in turn, connected to a radio transmitter 170 which generates a radio signal. The radio signal is received by a radio receiver (illustrated by antenna 172) which will receive the radio signal. It is believed that a low level, close range transmittable radio frequency would be suitable. The radio receiver must recognize an identifiable signal from the transmitter. It is contemplated that the pressure switch will not transmit until the pressure sensor gives it a voltage signal. The radio receiver generates a voltage which is wired to a first switch in a control box 168 which will activate or deactivate a supply solenoid 174 and supply valve 176 along with a bleed solenoid 178 and bleed valve 180. The control box is wired to the supply and bleed solenoids through wires 207 and 209.

An air pressure system, as illustrated at box 182, is powered by the engine of the transport vehicle. Existing manually operated shut-down switches 184 and 186 will shut off air pressure in the system 182 and return the belly valve 152 to the normally closed position. These are separate from the automatic shut-off system and can not override it.

The supply and bleed valves will work together with a cylinder 188 to open the plate 154 of the belly valve. Accordingly, once the belly valve 152 is open, compressed fluid will flow from the tank 146 through the belly valve 150, through the pump 152 and into the delivery hose 158.

Near the hose first end 160, in fluid communication with the pump 152, the coupling 156 includes an opening to which is attached a small, quarter inch pressure hose 190 in fluid communication with the pressurized fluid in the delivery hose. Pressure hose 190 leads back to a second pressure sensor 192 which can detect a drop in pressure and de-energize a set of electrical contacts. The second pressure sensor 192 is, in turn, wired to the control box 168. A second switch is activated by the second pressure sensor 192. The second switch will activate or deactivate the supply solenoid 174 and bleed solenoid 178. Wires 207 and 209 connect the supply and bleed solenoids to the control box.

It will be appreciated that either the first switch or the second switch is capable of closing the belly valve 150 so that a drop in pressure at either location will prevent additional flow of fluid.

The embodiment in FIG. 3 also includes the additional mechanical safety system. Accompanying and attached to the delivery hose 158 is a thin, steel cable 196. The cable 196 may be attached to the delivery hose every 6 to 8 inches or, alternatively, may be formed integrally with the hose. The cable 196 has a first end 198 terminating in a pin 200 which is receivable in a switch receptacle on the control box 168. The switch receptacle is likewise wired to the supply and bleed valves 176 and 180 through the supply solenoid 174 and bleed solenoid 178.

Thus, when the pin 200 is retracted or disengaged, as seen in dashed lines 202, the belly valve 150 will be caused to close. Cable 196 also has a second end 204 which will be hooked to an eyelet 206 on a riser 208 of the storage tank 148. In the event of a rupture of the delivery hose, a severing of the hose, or disconnection of the delivery hose from one of the couplings, pressurized fluid will quickly escape and cause deflection of the delivery hose. Deflection of the delivery hose 158 will cause the pin 200 to retract or become disengaged from the switch receptacle. The switch receptacle is likewise wired to the supply solenoid 176 and the bleed solenoid 178. Thereafter, the supply and bleed valves will cause the cylinder to move and the belly valve to close, preventing any additional pressurized fluid from escaping from the cargo tank on the vehicle.

FIG. 4 is a third, alternate embodiment of the present invention. The FIG. 4 embodiment would be used in conjunction with a bobtail cargo tank vehicle 10 shown in the FIG. 1 prior art rendering.

A belly valve 20 is in fluid communication with a cargo tank 12 of a bobtail vehicle through opening 210. The belly valve 20 is, in turn, in fluid communication with an inlet of a pump 18. The butterfly valve 20 is normally closed with a moveable plate 212. When the belly valve 20 is closed, no pressurized fluid can pass from the cargo tank 12 to the pump 18. As seen by the box marked “PTO”, the pump 18 is driven by a power take off 214 from the vehicle engine.

The direction of fluid flow from the belly valve 20 to the pump is illustrated by arrow 266. The direction of fluid flow out of the pump is illustrated by arrows 268.

The outflow or discharge from the pump 18 is connected to a coupling 216 which is, in turn, connected to a delivery hose 218. When the bobtail cargo vehicle arrives at the site of a storage container 42, a delivery hose 218 will be connected between the pump 18 and the storage container 42.

The delivery hose 218 has a first end 220 in fluid communication with the pump 18 and its coupling 216. The delivery hose 218 also has a second end 222 in fluid communication with the storage container 42 through coupling 40.

Near the hose second end 222, hose coupling 224 includes an opening therethrough to which will be attached a pressure sensor (not visible) which can detect a drop in pressure and activate a transmitter. The pressure sensor is wired to a radio transmitter 226 which generates a radio signal. The radio signal is received by a radio receiver (illustrated by antenna 228). The radio receiver converts the acceptable signal to operate a control circuit in a control box 230. The control box 230 is wired to a supply solenoid 232 and supply valve 234 along with a bleed solenoid 236 and bleed valve 238 by wires 240 and 242.

As in the previously described embodiments, near the hose first end 220, the coupling 216 includes an opening to which will be attached a small, quarter inch pressure hose 260 in fluid communication with the pressurized fluid in the delivery hose 218. The pressure hose leads back to a second pressure sensor 262 which can detect a drop in pressure and de-energize a set of electrical contacts.

Figure 5:
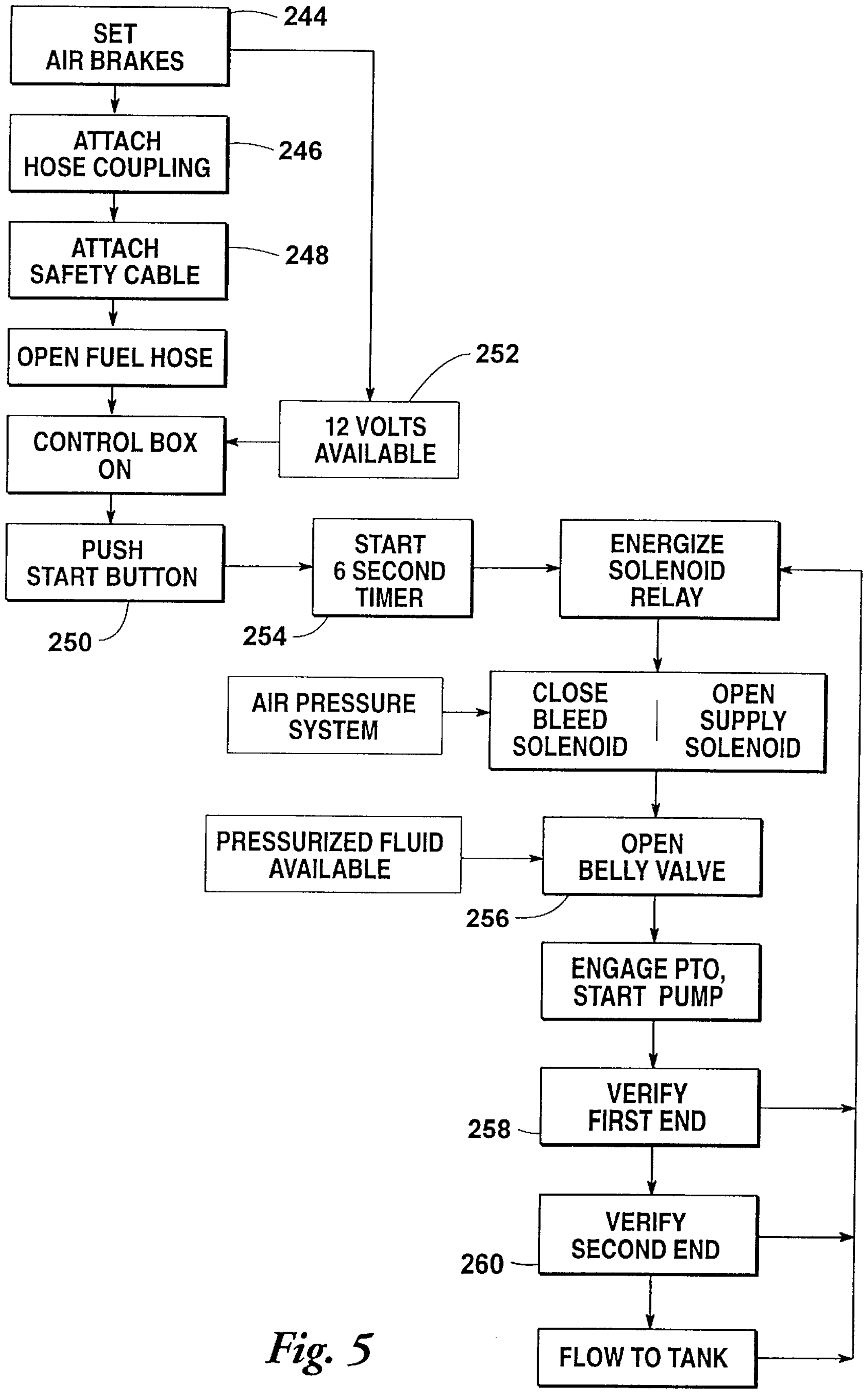
FIG. 5 is a simplified flow chart showing the various steps for transfer of pressurized fluid from a cargo tank vehicle to a storage container.

FIG. 5 is a flow chart illustrating the steps used in the safety system of the present invention. The actual unloading operation may vary slightly depending on the design of the particular cargo tank vehicle. The flow chart is particularly applicable to the embodiment shown in FIG. 2 with a highway transport although its general teachings will apply to the other embodiments as well.

With the vehicle engine running and the air pressure system of the vehicle in operation, the vehicle air brakes are set as shown at box 244. The delivery hose will be attached between the pump 56 and the storage container 74 as depicted by box 246. Thereafter, the cable 130 will be attached at both ends, the one end secured to the eyelet 142 on the riser 76 and the other end, which terminates in a pin 134, will be inserted into the receptacle in the control box 92, as shown by box 248. Unless the pin assembly is fully seated, the control box will not be powered.

The control box itself may have an on-off switch to supply voltage to the circuit from the vehicle electrical system (not shown). This step is illustrated at box 250.

The operator will manually push a start button on the control box (shown in FIG. 3 as button 230) which will permit voltage to flow to the control box, as depicted by box 252.

This will energize the supply and bleed solenoids 94 and 98 to close the bleed valve and open the supply valve in the air pressure system 110. The start button 230 is connected to a six (6) second timer to energize the first and second switches (as shown at box 254). By doing so, the belly valve will open (as shown at box 256), allowing compressed fluid to pass through the belly valve and through the pump into the delivery hose. As long as both pressure sensors verify pressure in the delivery hose at both ends (see boxes 258 and 260), the pump will be permitted to operate and the belly valve will remain open.

In the event either of the pressure sensors detects a drop in pressure, the control circuit causes the solenoids to automatically close the belly valve.

Figure 6:
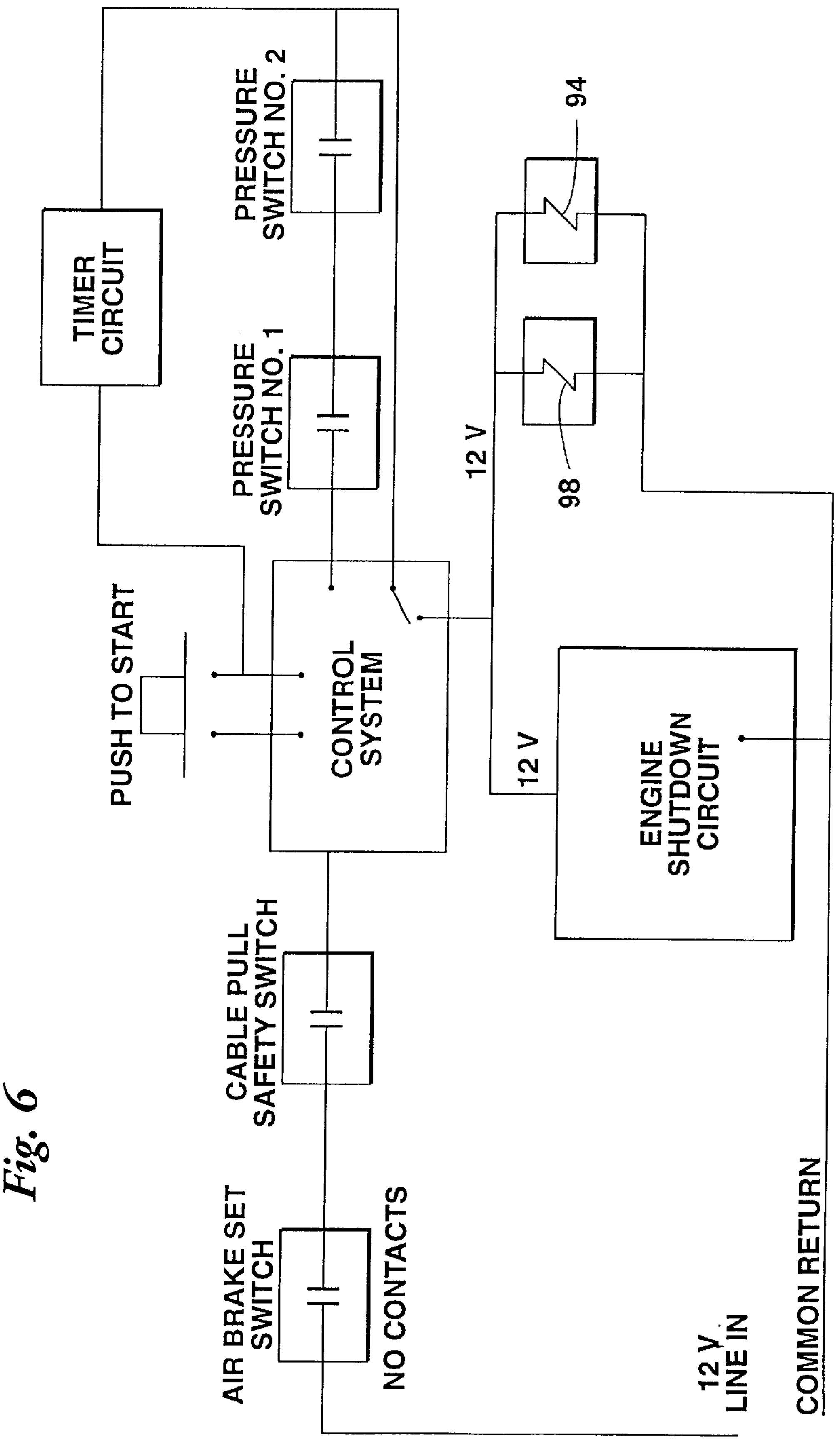
FIG. 6 is a simplified circuit diagram of the electrical circuit of the present system for transfer of pressurized fluid.

FIG. 6 is a simplified electrical circuit diagram showing the first and second switches and their relationship with the solenoids for the embodiment shown in FIG. 2.

Whereas, the present invention has been described in relation to the drawings attached hereto, it should be understood that other and further modifications, apart from those shown or suggested herein, may be made within the spirit and scope of this invention.

What is claimed is:

1. A safety system for transfer of pressurized fluid between a tank of a cargo vehicle and a storage container, which system comprises:

a pump or compressor on said cargo vehicle in fluid communication with said cargo tank, said pump powered by said vehicle;

a pump valve on said vehicle between said cargo tank and said vehicle pump to interrupt said fluid passing into said pump;

a delivery hose having a first end in fluid communication with said pump and a second end in fluid communication with said storage container for transfer of said pressurized fluid;

a first pressure sensor to sense pressure drops in said pressurized fluid in said delivery hose configured to convert fluid pressure into an electrical signal in response to a rupture, severing or uncoupling of said delivery hose, said first pressure sensor at said hose second end;

a first switch activated by said first pressure sensor, said first switch in communication with said pump valve to completely close said pump valve to immediately interrupt flow of said pressurized fluid when said pressure drop occurs in said delivery hose;

a second pressure sensor to sense pressure drops in said pressurized fluid in said delivery hose configured to convert fluid pressure into an electrical signal in response to a rupture, severing or uncoupling of said delivery hose, said first pressure sensor at said hose first end; and a second switch activated by said second pressure sensor, said second switch in communication with said pump valve to completely close said pump valve to immediately interrupt flow of said pressurized fluid when said pressure drop occurs in said delivery hose.

2. A safety system for transfer of pressurized fluid as set forth in claim 1 including a pressure hose extending from said hose first end to said second pressure sensor whereby said second pressure sensor is activated by a change in pressure of said pressurized fluid.

3. A safety system for transfer of pressurized fluid as set forth in claim 1 including a pressure hose in communication with said delivery hose, said pressure hose extending from near said hose second end to said first pressure sensor, whereby said first pressure sensor is activated by a change in pressure of said pressurized fluid.

4. A safety system for transfer of pressurized fluid as set forth in claim 1 including:

a radio transmitter in communication with said first pressure sensor and a radio receiver in communication with said first switch, so that a change in pressure will be communicated to said first switch to close said pump valve.

5. A process to transfer pressurized fluid from a tank of a cargo vehicle to a storage container through a delivery hose having a first end in communication with a pump on said cargo vehicle and a second end in communication with said storage container, which process comprises:

sensing pressure in said delivery hose at said hose second end wherein said pressure is converted to an electrical signal;

activating a first switch in response to a drop in pressure in said delivery hose in response to a rupture, severing or uncoupling of said delivery hose;

completely closing a pump valve between said cargo tank and said vehicle pump in response to activation of said first switch;

sensing pressure in said delivery hose at said hose first end wherein said pressure is converted to an electrical signal;

activating a second switch in response to a drop in pressure in said delivery hose in response to a rupture, severing or uncoupling of said delivery hose.

* * * * *